US008295166B2

(12) United States Patent
Woo

(10) Patent No.: US 8,295,166 B2
(45) Date of Patent: Oct. 23, 2012

(54) HIGH SPEED INDUSTRIAL CONTROL AND DATA ACQUISTION SYSTEM AND METHOD

(75) Inventor: Donald Woo, West Bend, WI (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 1179 days.

(21) Appl. No.: 11/787,587

(22) Filed: Apr. 17, 2007

(65) Prior Publication Data

US 2008/0259958 A1    Oct. 23, 2008

(51) Int. Cl.
    *H04J 1/16*    (2006.01)
(52) U.S. Cl. .................. 370/229; 700/2; 700/7; 700/9; 700/83
(58) Field of Classification Search .......... 370/229–241; 700/2, 7, 9, 83
    See application file for complete search history.

(56) References Cited

U.S. PATENT DOCUMENTS

| | | | | |
|---|---|---|---|---|
| 4,866,701 | A * | 9/1989 | Giacopelli et al. | 370/411 |
| 5,999,937 | A * | 12/1999 | Ellard | 707/101 |
| 6,067,553 | A * | 5/2000 | Downs et al. | 715/206 |
| 6,749,017 | B1 * | 6/2004 | Lu et al. | 166/53 |
| 2001/0003804 | A1 * | 6/2001 | Papadopoulos et al. | 700/83 |
| 2002/0110226 | A1 * | 8/2002 | Kovales et al. | 379/88.17 |
| 2002/0186661 | A1 * | 12/2002 | Santiago et al. | 370/252 |
| 2003/0095447 | A1 * | 5/2003 | Dean | 365/200 |
| 2004/0105403 | A1 * | 6/2004 | Lin et al. | 370/316 |
| 2004/0125797 | A1 * | 7/2004 | Raisanen | 370/389 |
| 2005/0018709 | A1 * | 1/2005 | Barrow et al. | 370/465 |
| 2008/0114841 | A1 * | 5/2008 | Lambert | 709/206 |

OTHER PUBLICATIONS

Wikipedia. ASCII. Mar. 12, 2006. <http://web.archive.org/web/20060312203402/en.wikipedia.org/wiki/ASCII>.*
Wikipedia. IPv6. Mar. 13, 2006. <http://web.archive.org/web/20060313084928/en.wikipedia.org/wiki/Ipv6>.*
LinuxManPages.com. Socket. Feb. 8, 2007. <http://web.archive.org/web/20070208074035/http://www.linuxmanpages.com/man2/socket.2.php>.*

* cited by examiner

*Primary Examiner* — Hassan Kizou
*Assistant Examiner* — Ashil Farahmand
(74) *Attorney, Agent, or Firm* — Fletcher Yoder, P.C.; Alexander R. Kuszewski; John M. Miller

(57) ABSTRACT

A high speed industrial control system and data acquisition system and method are disclosed that enable high speed data transmission rates from an control system to a remote client application. In one embodiment, the system includes a first processor, a second processor, an open-socket interface, and a client application. The first processor is configured to generate data arrays and the second processor is configured to receive and convert the arrays into time stamped message sets. The open-socket interface may be coupled to the second processor and may be configured to transmit packet sets from the second processor to a client application. The client application may be configured to convert each packet set into individual records that are included in a standard structured data format. One of the standard structured data format may be a standard database format.

25 Claims, 9 Drawing Sheets

HIGH SPEED INDUSTRIAL CONTROL AND DATA ACQUISTION SYSTEM AND METHOD

BACKGROUND

The present invention relates generally to a high speed industrial control and data acquisition system and method. More specifically, the invention relates to a system or method for converting and transferring process data from an industrial control system to a remote client application.

Programmable logic controllers ("PLCs") or programmable controllers are used to control and automate industrial processes. Unlike standard personal computers, programmable controllers are designed for harsh operating conditions and find applications in various industries. For example, programmable controllers may be used to automate assembly lines, food industry packaging lines, oil and gas production systems, wastewater management systems, as well as many other applications. Moreover, supervisory control and data acquisition ("SCADA") systems may make use of a network of multiple programmable controllers to centrally monitor, operate, and/or control remote systems that may be located over a large geographic area.

Additionally, programmable controllers often include special input/output ("I/O") modules that enable sensors or transducers to interface and communicate with them to carry out control and monitoring functions. These sensors or transducers provide the necessary feedback that enables real-time control of the target process. In sum, the data received by the programmable controller or controllers from the feedback sensor, or similar feedback devices, may have significant value. For example, this data may be used for troubleshooting, optimization, product tracking, production monitoring, maintenance monitoring, scheduling, and various other control and monitoring functions.

As with many data transmission processes, that data transmission rate is often the limiting factor and impacts the overall performance of the control system. Likewise, as the volume of the process data increases, the efficiency of the control process decreases. Therefore, because automated industrial processes often generate a plethora of data, the control, monitoring, and operation of a programmable controller may be significantly impacted by the data transmission rate. In other words, slow transmission rates from the programmable controller to a remote client may not provide the real-time response required for the application. For example, current automated systems may be limited to 150-500 milliseconds average transmission rates which are often too slow for complex industrial applications. Additionally, some of these systems are programmed for proprietary operating systems that are not compatible with standard operating systems or third party applications, such as databases that could make use of the data for analysis purposes.

Therefore, there exists a need for a system or method that can provide a high speed data transmission rate from a control circuitry to a remote location. Further, it would be advantageous if the system or method could provide the high speed data rates using a standard format that is configured to ultimately be placed in a standard structured data format.

BRIEF DESCRIPTION

The present invention offers a novel approach to data capture and transfer from control and monitoring systems designed to address such needs. The approach is based on a system or method that enables a high speed data transmission rate from a control or monitoring system to a remote client application. In one embodiment of the present invention, the system includes a first processor, a second processor, an open-socket interface, and a client application. The first processor is configured to generate data arrays of input, output, or computed values and may be part of a programmable controller or may be separate from a programmable controller. The second processor is configured to receive the data arrays from the first processor and to convert the arrays into messages. The second processor may be further configured to convert data in the arrays to a plurality of messages and to associate the messages in a time stamped set, with each message including a plurality of tags, and each tag corresponding to a single input, output, or computed value.

The first and second processors may be coupled to one another on a common data backplane. Additionally, the open-socket interface may be coupled to the second processor on a common data backplane and may be configured to transmit the messages, as a packet set, from the second processor to a client application. The client application may be configured to buffer a fixed number of packets and insert the buffered packets into a process queue. The client application may also be configured to separate individual packets and to create data files. The client application may be further configured to verify the total number of packets and tags in a set by tracking the number of packets received between timestamps and counting the number of tags in each packet received from the open-socket interface. Finally, the client application may be configured to convert each of a plurality of tags in the packet to individual records that are included in a standard structured data format. One of the standard structured data format may be a standard database format.

In another embodiment of the present invention, a method for transmitting data from an industrial control system to a remote client application includes enabling a first processor to generate data arrays of input, output, or computed values. A second processor then converts the data in the arrays to messages. The messages are then transmitted from the second processor via an open-socket interface. The messages are then received from the open-socket interface as packets and converted to time stamped records in a standard structured data format.

The various operations of the method may each be performed by separate devices coupled to one another on a common data backplane. Additionally, the data in the arrays may be converted to a plurality of messages and the messages associated in time stamped sets, where each message including a plurality of tags that correspond to single inputs, outputs or computed values. Sets of messages may be associated into packets and the packets may be grouped into a process queue. The total number of packets and tags in a set may be verified by tracking the number of packets received between timestamps and counting the number of tags in each packet received from the open-socket interface. Individual packets may be separated and data files created. Moreover, each of a plurality of tags in the packets may be converted to individual time stamped records in the standard structured data format.

In another embodiment of the present invention, the time stamp is included in the first message of the message set that is transmitted from the second processor to the open-socket interface. Each transmission of a message will contain a new time stamp associated to each new message set sent to the open-socket interface.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Various embodiments of a data transmission system and method are provided that enable high speed data transmission rates from a control or monitoring system, such as an industrial control system, to a remote client application. The inventive technique may be based upon a programmable controller, data concentrator, data converter, an open socket interface, and client application. The data concentrator may be part of the programmable controller or may be separate from the controller. The data concentrator and the data converter each include an individual processor. The processors may be coupled to one another on a common data back plane or may be connected via a virtual back plane. Additionally, the open-socket interface may be coupled to the second processor via a common data back plane.

The data concentrator receives the process data from the programmable controller and converts it into a data array via the first processor. The data array may include short integers, long integers, or real values that are representative of the process data, such as input, output or computed values in an automation control arrangement. The data array may be of various sizes, with one of the contemplated embodiments enabling a 1,000 element array. The data array is then converted into a plurality of messages via a second processor that is included in the data converter. The second processor further associates the messages into time stamped sets, with each message including a plurality of tags, and each tag corresponding to a single input, output, or computed value. The set may be of various sizes, with one of the contemplated embodiments limiting the sets to 1,000 tags.

The message sets are then transmitted as packet sets to a client application via the open-socket face interface. The open-socket interface may be enabled by a web server module that establishes a communication link between the client application and the data converter. The client application may be executed on any of a range of computer systems, such as a high performance personal computer that includes a standard operating system that supports multithreading. In a presently contemplated embodiment, the client application further includes a VB.NET application that receives the packet set and converts the packets into a standard structured data format. The standard structured format may include standard database formats or open database connectivity compliant formats that are compatible with a third party applications or systems. In sum, embodiments of the present invention provide high speed data transmission from a control or monitoring system to a remote client application by enabling sampling rates of less than 20 milliseconds for up to 1000 real or integer data values.

Figure 1:
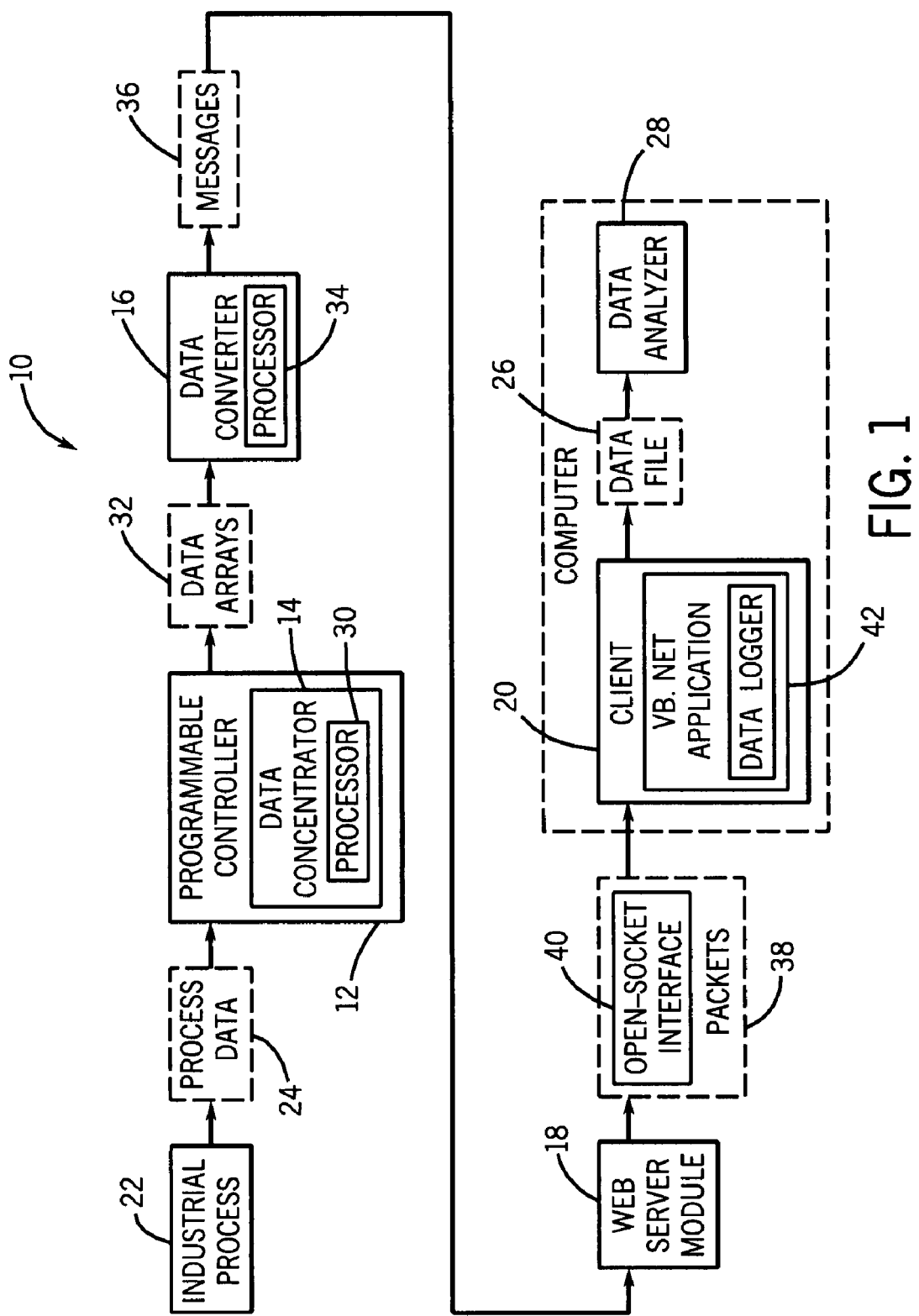
FIG. 1 is a diagrammatical representation of a system for converting and transmitting process data from a control or monitoring system to a data analyzer in accordance with aspects of the invention.

Turning now to the drawings, FIG. 1 is a diagrammatical representation of a system for converting and transmitting process data from a control or monitoring system, such as an industrial control system to a data analyzer. The system 10 includes a programmable process controller or programmable controller 12, data concentrator 14, data converter 16, web server module 18, and a client 20. System 10 is coupled to an industrial process 22 that generates process data 24. Process data 24 may include inputs, outputs, computed values, or any other related data. Process data 24 may include short integers, long integers, or real values that are representative of various parameters of the process, its system, subsystems, components, and so forth. System 10 receives process data 24 and, as discussed in more detail below, converts and transmits the data to client 20. Client 20 then generates data files 26 in a standard structured data format that may then be read by a data analyzer 28. Data analyzer 28 may include an application located on client 20 or may include a third party application or system that is independent of client 20.

Generally, the conversion and transmission process begins with the data concentrator 14 receiving process data 24 and converting it into a number of data arrays 32 via a first processor 30. In one embodiment of the present invention, each data array generated includes a 1000 element array of either real values or integer values, or a combination thereof in separate arrays. Data array 32 is then transmitted to the data converter 16 where it is processed by a second processor 34. Second processor 34 converts the data array 32 into messages 36, where multiple messages may constitute a set. In one embodiment of the present invention, programmable controller 12 and data concentrator 14 are included in a single 1756 ControlLogix™ system available from Rockwell Automation, located in Mayfield Heights, Ohio. The 1756 ControlLogix™ system provides discrete, drives, motion, process, and control together with communications and state-of-the-art I/O packaging. Further, the 1756 ControlLogix™ system is modular and may include a standalone controller with I/O modules in a single chassis; multiple controllers in a single chassis; multiple controllers joined across a network; or I/O located on multiple platforms that are distributed in remote locations and connected over multiple I/O links.

The 1756 ControlLogix™ system may include a ControlLogix™ processor as represented by first processor 30. Further, data converter 16 and second processor 34 may also be a part of this system or may be an individual system. In either embodiment, second processor 34 may also include a ControlLogix™ processor that may be coupled to the first processor 30 on a common back plane. An exemplary embodiment of the ControlLogix™ processor is available from Rockwell Automation.

Messages 36 include a number of individual tags that may represent a short integer, long integer, or real value. For example, if data array 32 includes short integers, each tag may comprise 2 bytes of data. Similarly, if data array 32 includes long integers or real values, each tag may comprise 4 bytes of data. The configuration of data sets, messages, and tags will be discussed in more detail below with regards to FIG. 4.

Web server module 18 converts the messages into packets before sending to the client 20 via an open-socket interface 40. Open-socket interface 40 enables the web server module 18 to open transmission control protocol ("TCP"), internet protocol ("IP"), or user datagram protocol ("UDP") communication links to client 20 and/or other standard Ethernet devices. Additionally, web server module 18 enables communication with Ethernet devices that do not support EtherNet/IP application protocol, such as bar code scanners or RFID readers. In sum, open-socket interface 40 is a virtual connection that establishes a communication link between two host ports. In one of the contemplated embodiments of the present invention, web server module 18 may include the 1756-EWEB enhanced web server module for ControlLogix™ controllers. The 1756-EWEB module is available from Rockwell Automation, Inc. The 1756-EWEB module supports EtherNet/IP communications and provides a suite of web capabilities.

Client 20 may include any suitable computer, such as a high performance personal computer, or similar device, having application software 42 configured to receive packets 38 and converts the packets into data files 26. In one embodiment of the present invention, application software 42 utilizes a Visual Basic .NET ("VB.NET") object-oriented computer programming language that facilitates the build and programming of software applications. As discussed in more detail below, VB.NET application software 42 may be executed on client 20 that includes a standard operating system, such as the Windows operating system ("OS"). Using a standard OS provides universal compatibility with third party applications and may eliminate legacy problems that can occur when a proprietary OS becomes obsolete or is no longer supported. However, embodiments of the present invention are not limited to the Windows OS and may utilize any suitable OS.

Application software 42 generates data files 26 that may include a standard structured data format or a standard database format (e.g., "DBase"). For example, the standard structured data format may include the DBase IV DBF format. This file format is currently supported by a number of database management and spreadsheet systems enabling it to be accessed by various third party applications and systems. Additionally, data files may include a program specific database format. An example of a program specific database file may include one generated for the RSView® Enterprise™ Series available from Rockwell Automation. This series includes a line of human machine interface ("HMI") software products designed with a common look, feel, and navigation to help speed application development and training time. Specifically, in one embodiment of the present invention, application software 32 generates a DBF formatted file (*.DNS) used by RSView Supervisory Edition ("SE"). This software edition includes a distributed and scalable architecture that supports multiserver/multi-client applications. The data files generated in this format are "ready for use" by the RSView trend control, such as to facilitate historical graphing. Further, this method enables a high speed sample rate for the RSView data log model of less than 20 milliseconds. In the present context, "high speed sample rate" may be defined as transfer rate of less than 20 millisecond average of at least 500 data points, where the data points include short integer, long integers, and/or real values.

Additionally, data files 26 may include a format that is open database connectivity ("ODBC") compliant. ODBC includes a standard database method that enables a user to access any data from any application regardless of the database management system that is interpreting the data. ODBC enables this by inserting a middle layer, called a database driver, between the application and the database management system. The purpose of the database driver is to translate the applications queries into commands that the database management system can interpret. Therefore, embodiments of the present invention may include generating a file for a data analyzer that is ODBC compliant. Further, the essence of the invention is not limited to ODBC and may include any other access system that enables a user to read standard structured data format files.

Figure 2:
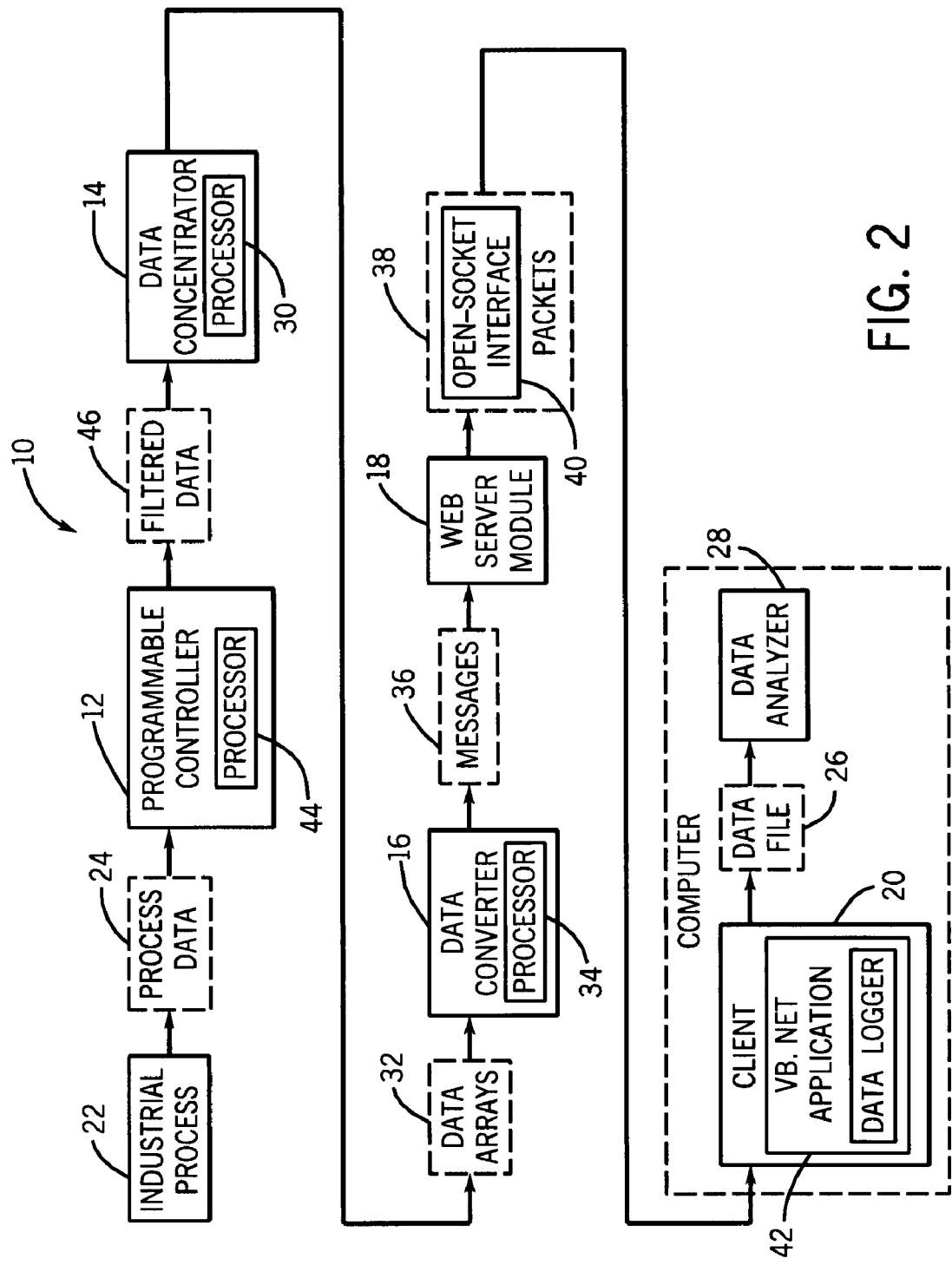
FIG. 2 is a diagrammatical representation of an alternate embodiment of the system for converting and transmitting process data from a control or monitoring system to a data analyzer.

FIG. 2 illustrates an alternate embodiment of system 10 for converting and transmitting process data from industrial control system 22 to data analyzer 28. This embodiment is similar to the one illustrated in FIG. 1 except that programmable controller 12 includes a separate processor 44 to receive process data 24. The programmable controller may then produce filtered data 46 that is received by data concentrator 14 and first processor 30. As illustrated by the figures, programmable controller 12, data concentrator 14, and data converter 16 may be individual units or may be contained in a single system and coupled on a common data backplane. Further, web server module 18 and open-socket interface 40 may also be coupled to first processor 30 and second processor 34 on a common data backplane. As with the system in FIG. 1, system 10 receives process data 24 or filtered data 46 from industrial process 22, and, after a series of steps, generates data files 26 that may be accessed by data analyzer 28.

Figure 3:
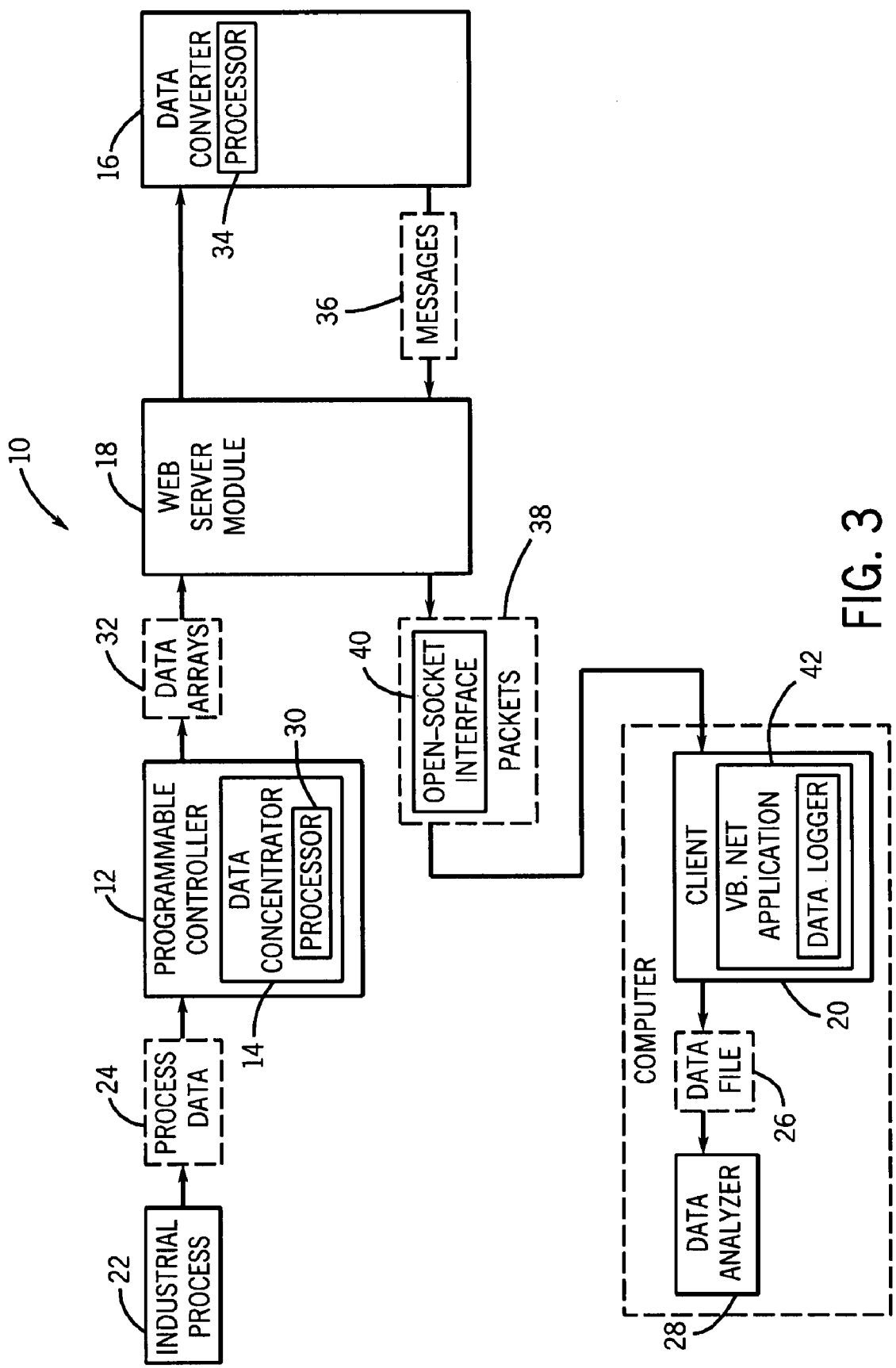
FIG. 3 is a diagrammatical representation of a second alternate embodiment of the system for converting and transmitting process data from a control or monitoring system to a data analyzer.

FIG. 3 illustrates a second alternate embodiment of system 10 for converting and transmitting process data from an industrial control system to a data analyzer. This embodiment is similar to the one illustrated in FIG. 1 except that data concentrator 14, data converter 16, web server module 18, and client 20 may be remotely located from one another. In this embodiment, programmable controller 12 and data concentrator 14 may share first processor 30. However, as illustrated in FIG. 2, a separate processor may be included in the programmable controller 12. Additionally, data concentrator 14 and first processor 30 may be separate and/or remotely located from programmable controller 12. System 10 operates in a generally similar manner as discussed above with data concentrator 14 receiving process data 24 and converting it into data array 32. Web server module 18 then transmits data array 32 to data converter 16. Similarly to the first two embodiments, second processor 34 then converts the data array 32 into time stamped messages 36. Web server module 18 then converts messages 36 into packets 38 and transfers the packets to client 20 via open-socket interface 40. Client application 42 receives the packets and converts them into data files 26 which may then be accessed by data analyzer 28.

Figure 4:
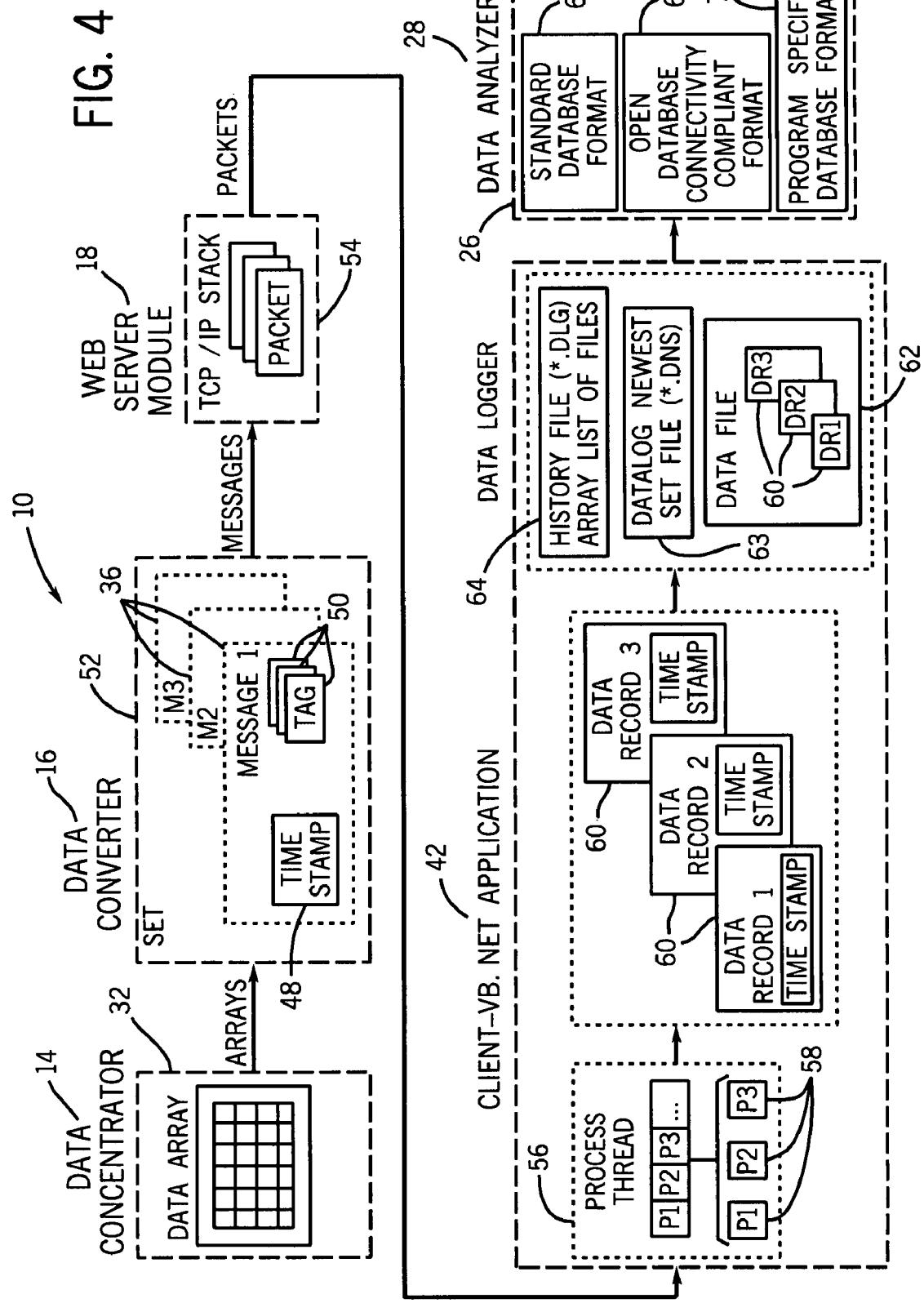
FIG. 4 is a diagrammatical representation of the system shown in FIGS. 1-3, further illustrating the conversion and transmission process starting with a data array and ending in a generated data file.

FIG. 4 further illustrates the conversion and transmission process for the high speed industrial control and acquisition system and method shown in FIGS. 1-3. As discussed above, data array 32 is generated by data concentrator 14 via the first processor and includes either short integers, long integers, real values, or a combination thereof. Data concentrator 14 then transmits data array 32 to the data converter 16. Data converter 16 divides data array 32 into individual messages 36 that include a time stamp message 48 which comprises a time stamp and a plurality of tags 50. As discussed above, each tag 50 may include short integers, such as data comprising 2 bytes or long integers/real values, such as data comprising 4 bytes. The number of messages required to encapsulate the data array 32 tags constitute a message set 52.

In one embodiment of the present invention, message set 52 is limited to 1,000 tags and messages 36 are limited to 496 bytes. For example, one message set 52 may include 8 data messages containing 116 tags of real values (each real value comprising 4 bytes of data), and 1 time stamp message (that may include up to 72 tags), thereby totaling to a 1,000 tags for the set. In another example, message set 52 may include 4 messages containing 232 tags of short integers (each short integer again comprising 2 bytes of data), and 1 time stamp message (that may include up to 72 tags), thereby totaling to a 1,000 tags for the set. Therefore, as illustrated, each set 52 may include various numbers of messages 36 depending on the underlining tag content (i.e., short integer, longer integer, or real value). Time stamp 48 may include the date and time in milliseconds. Finally, it should be noted that even though the presently contemplated embodiment utilizes a data set that includes 1,000 tags, the present invention is not limited to this number and each data set may include a single tag or more than 1,000 tags.

As discussed above, each message 36 constitutes a packet and web server module 18 puts the packets onto the TCP/IP stack 54 for transmitting to client 20 via open-socket interface 40. Client application 42 located on client 20 then receives the packets by buffering a fixed number and copying the buffer into a process queue. Process thread 56 proceeds to break the grouped packets back into individual packets 58. Individual packets 58 are then further processed to generate individual data records 60 which may include time stamps, short integers, long integers, real values, or a combination thereof. Individual data records 60 are then compiled into a data file 62. A history file, (*.dlg) 64 may then be generated or updated along with a datalog newest set (*.dns) 63 file. Data files 26, which may include a number of data file 62, may then be generated enabling a user to read the files via data analyzer 28. As discussed above, data files 26 may include a standard structured data format that may be in a standard database format 66, ODBC complaint format 68, or program specific database format 70.

Figure 5:
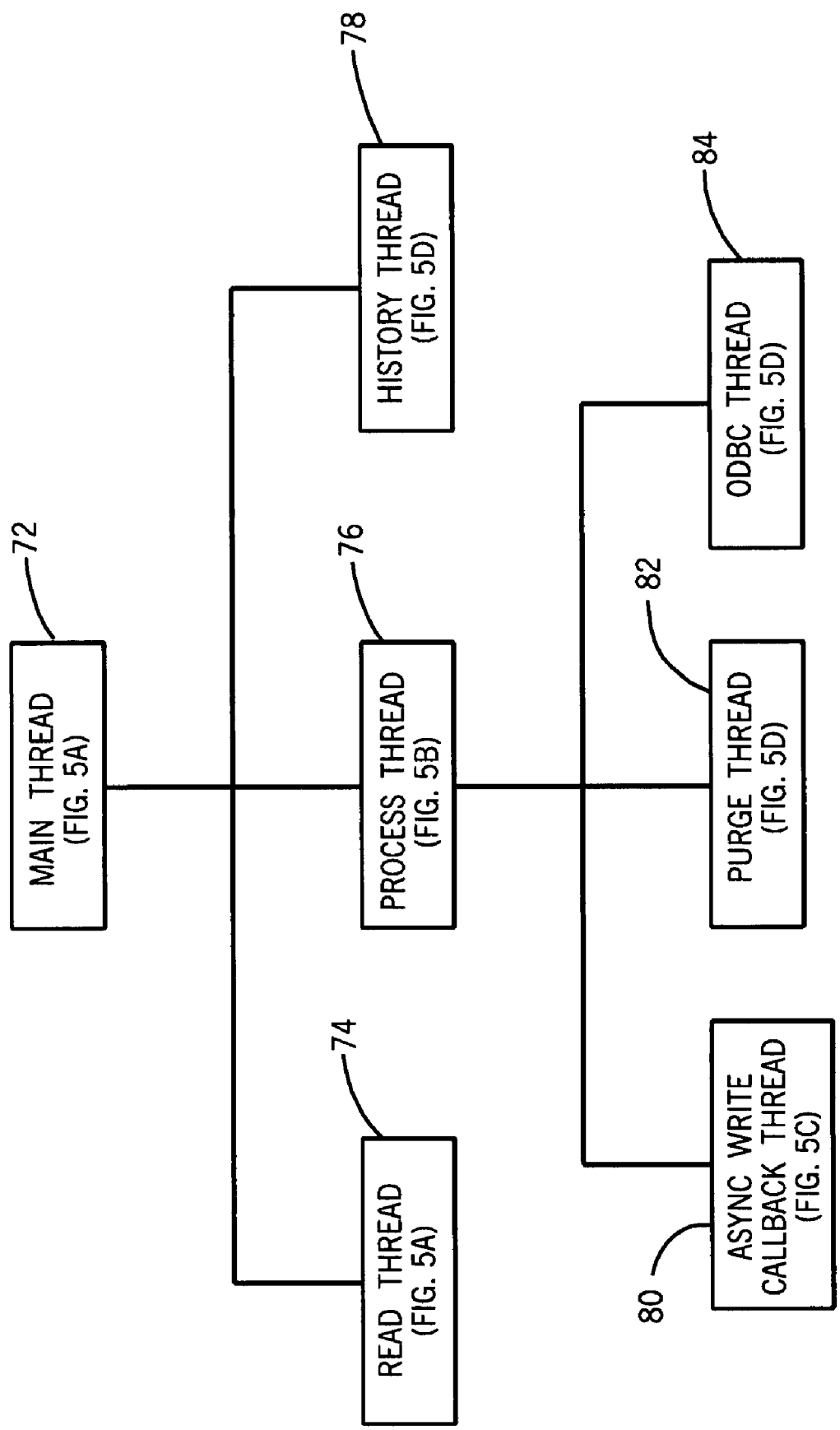
FIG. 5 is a block diagram illustrating one embodiment of a multithreading client application executed by a computer that receives packetized data from the system illustrated in the preceding figures.

FIG. 5 is a block diagram further illustrating VB.NET client application 42 which may be configured by the user to receive the packets from the web server module and convert the packets into data files. VB.NET client application 42 may be run on client 20 that includes an operating system that can simultaneously execute each of the threads discussed below. For example, VB.NET application 42 may include main thread 72, read thread 74, process thread 76, history thread 78, as well as process sub-threads async write callback 80, purge 82, and ODBC 84. Further, each thread and sub-threads may be executed in series or in parallel with one another. Each thread and sub-thread will be discussed in more detail below.

Figure 5A:
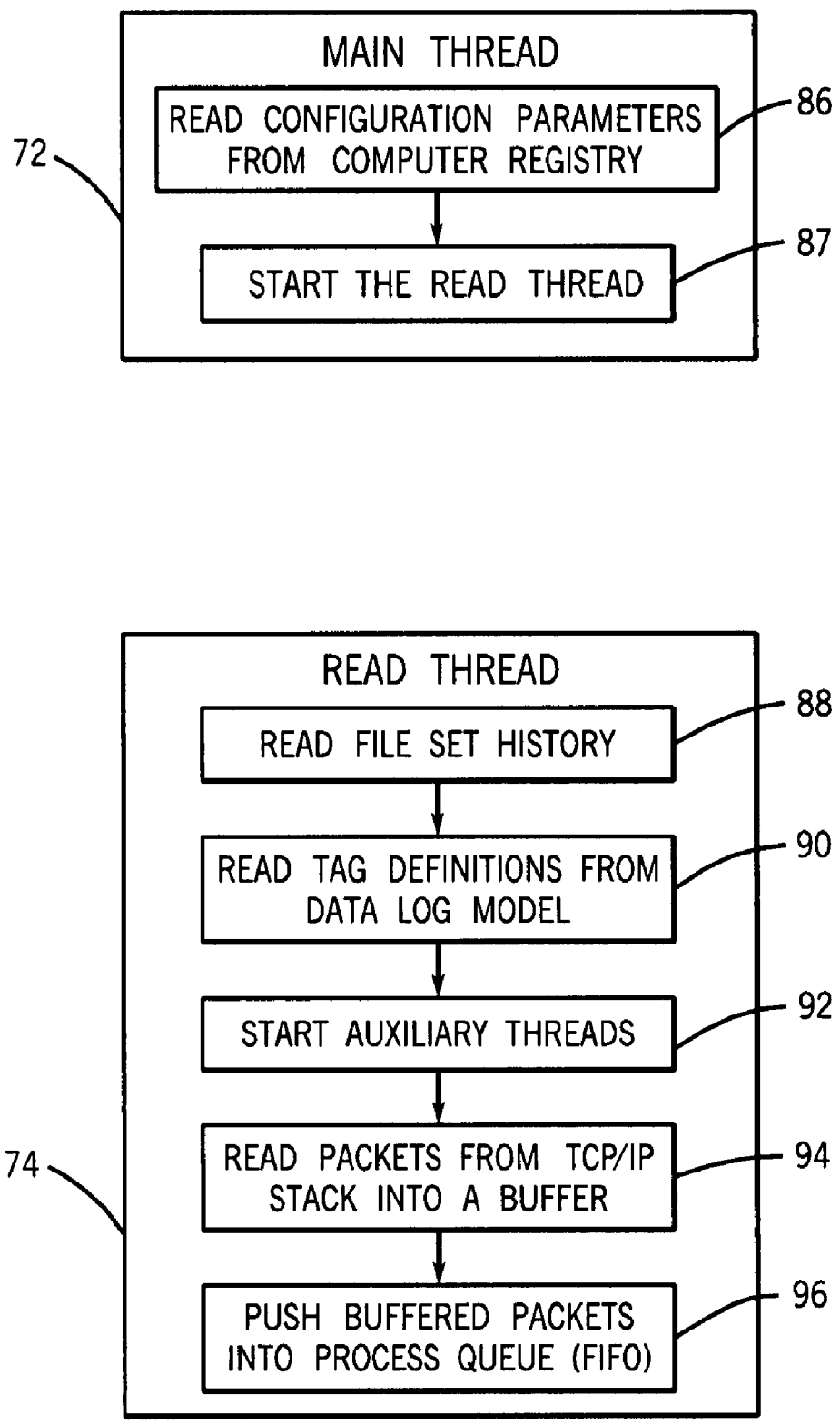
FIG. 5A is a block diagram that further illustrates the main thread and the read thread shown in FIG. 5, as well as their respective functions.

FIG. 5A illustrates main thread 72 and read thread 74, and their respective functions. Main thread 72 includes the initial set-up threads for VB.NET application 42. For example, function 86 may include reading the configuration parameters from the client computer registry. These configuration parameters may include the IP address for web server module 18, establishing a archival path for local or remote data storage, establishing the auto-start and sampling mode parameter (i.e., on/off settings), determining file management configuration (i.e., to archive or delete file, when to delete or archive files), establishing a sampling period or data collection period, and any other relevant configuration parameters. Main thread 72 also starts read thread 74 via function 87.

Read thread 74 may include various functions, including function 88 to read the file set history from history file 64 (*.dlg). The history file will be discussed in more detail below with regards to history thread 80. Further, function 90 may include reading tag definitions from an RSView SE data log model. These tag definitions instruct pen mapping for the RSView SE trend screen and facilitate historical trending. Additionally, read thread 74 may include function 92 which starts all the auxiliary threads discussed in more detail below.

Read thread 74 may also include function 94 to read packets from the TCP/IP stack. In one embodiment of the present invention, function 94 read groups of 5 packets off the TCP/IP stack into a buffer for processing. Additionally, in order to verify that messages or tags are not lost or dropped during transfer, function 94 may initially read 10 sets (a set is the total number of packets received between packets containing the time stamp, equivalent to a message set 52) in order to determine the number of tags in each message thereby establishing a uniform count. Given the count should remain constant for each set, function 94 may then compare the number of tags contained in a set to the established count (from the datalog model) to verify that tags are not lost or dropped during transmission. Once the packets are read, function 96 then pushes the buffered packets into a process queue.

Figure 5B:
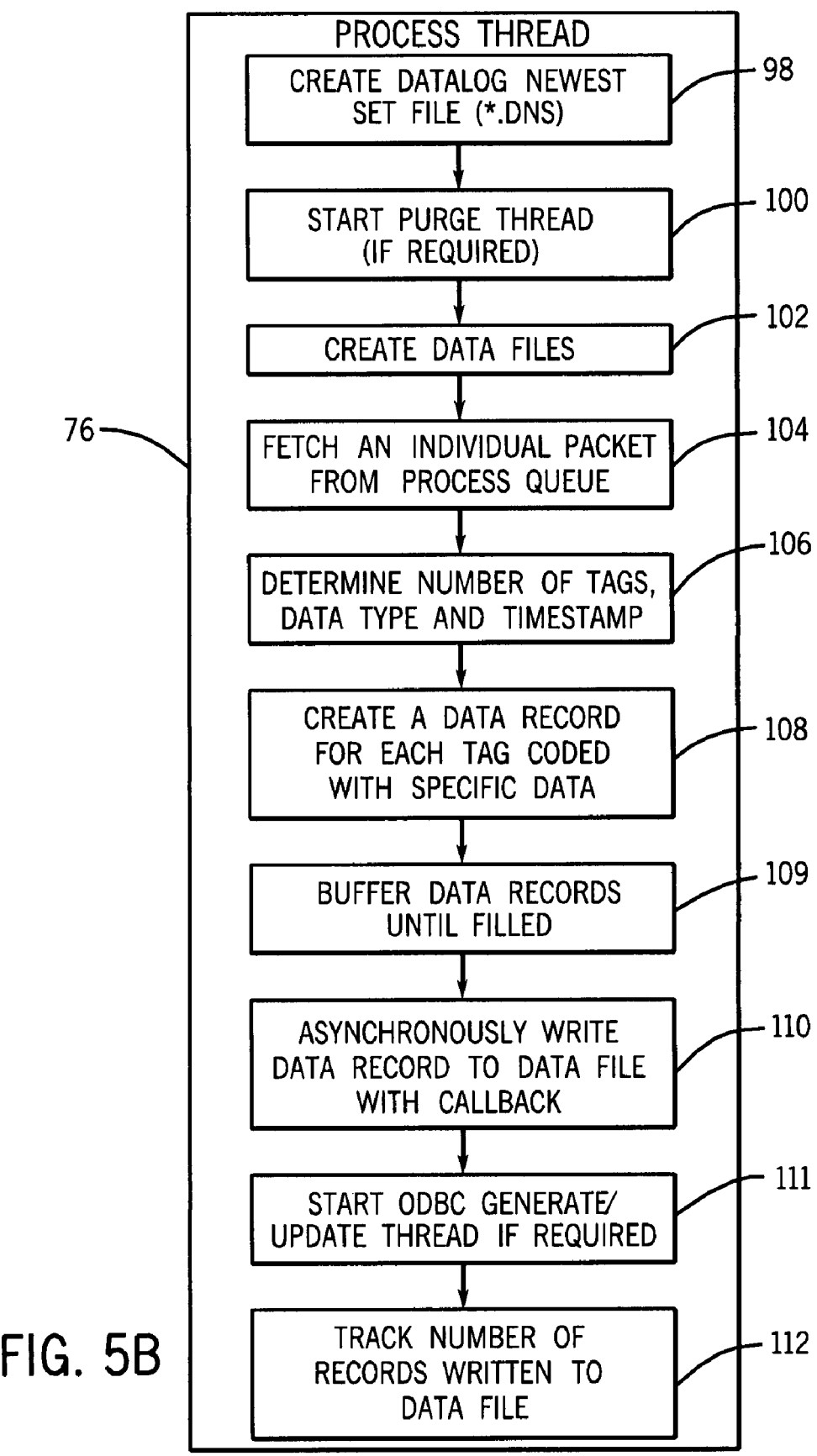
FIG. 5B is a block diagram that further illustrates the process thread shown in FIG. 5, as well as its respective functions.

FIG. 5B illustrates process thread and its respective functions. Process thread 76 processes the packets stored in the process queue through several functions. Function 98 creates the datalog newest set file (*.dns) that enables the system to keep track of the latest data file. Function 100 determines if data files needs to be purged from the computer hard-drive based on the configuration settings read in main thread 72 function 86. Function 102 creates the data files and writes the appropriate header information.

Process thread 76 then retrieves the packets from the process queue via function 104. The time stamp, number of tags and data type is then determined by function 106. Next, a data record for each tag is created and is coded with the specific data for that tag using function 108 (see item 60, FIG. 4). For example, the data might include a time stamp, an integer, a real value, or a combination thereof. Each record generated is stored into a buffer via function 109, and then once full, is asynchronously written to a data file using function 110 (see item 62, FIG. 4). Additionally, if an ODBC database is used, the records are also stored in a secondary buffer for the ODBC thread 84 to process. Thus, multithreading application 42 increases the conversion speed by enabling I/O functions asynchronously of the other threads. Further, if an ODBC database is used, function 111 starts the ODBC thread to handle processing the records into the ODBC database file. The number of records written to a data file is tracked using function 112.

Figure 5C:
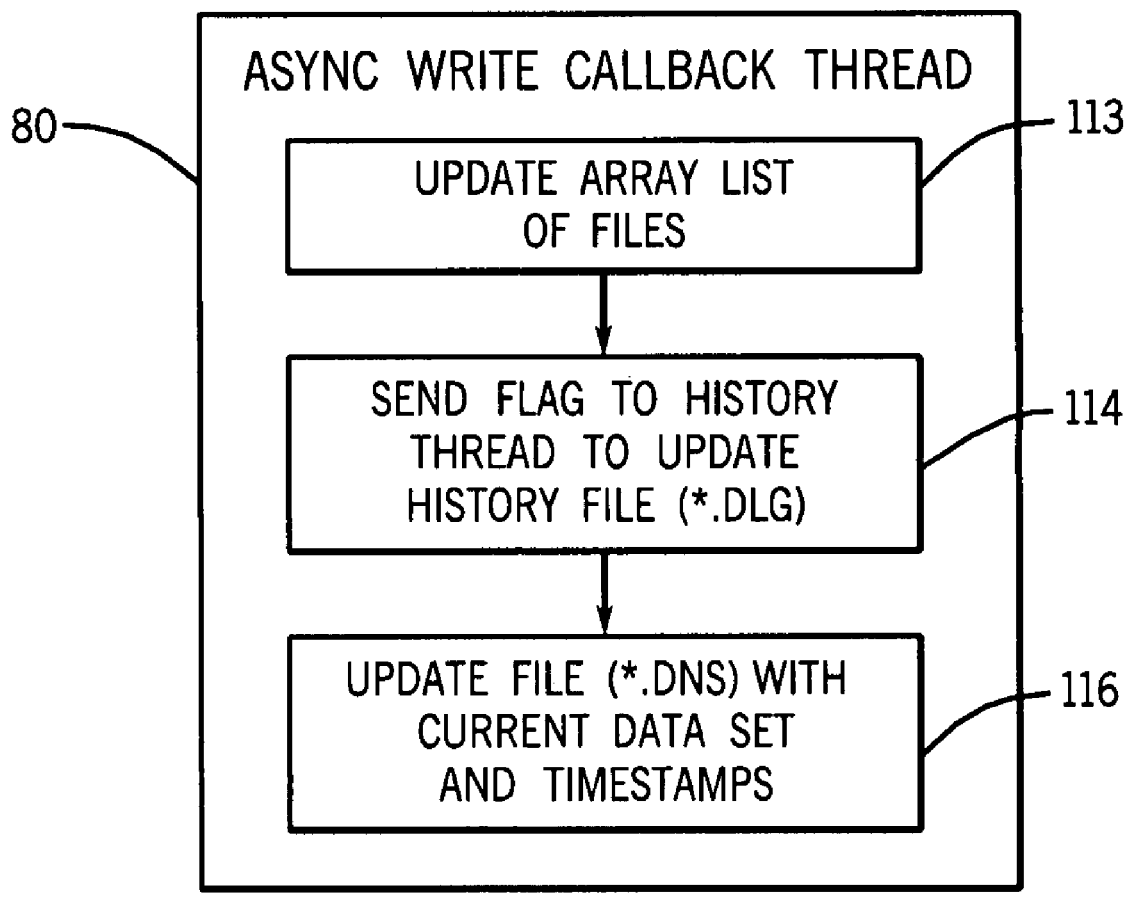
FIG. 5C is a block diagram that further illustrates the async callback write thread shown in FIG. 5, as well as its respective functions.

FIG. 5C illustrates async write callback thread 80 and its respective functions. Upon completion of write function 110, function 113 updates the arraylist of files to include the latest ending timestamp of the current set 52. Further, function 114 sends a flag to history thread 78 to update the arraylist of files each time a new data file is created or updated with new records (see item 64, FIG. 4). As discussed in more detail below, the arraylist of files serves as a master road map for each of the data files generated. In other words, the arraylist of files establishes the temporal connection between each of data files 62 so that the relevant data may be placed in its proper order creating a historical record of all tags. Finally, function 116 updates the datalog newest set (*.dns) data file to include the current data set with the start and current ending time stamp thereby temporally arranging the data sets.

Figure 5D:
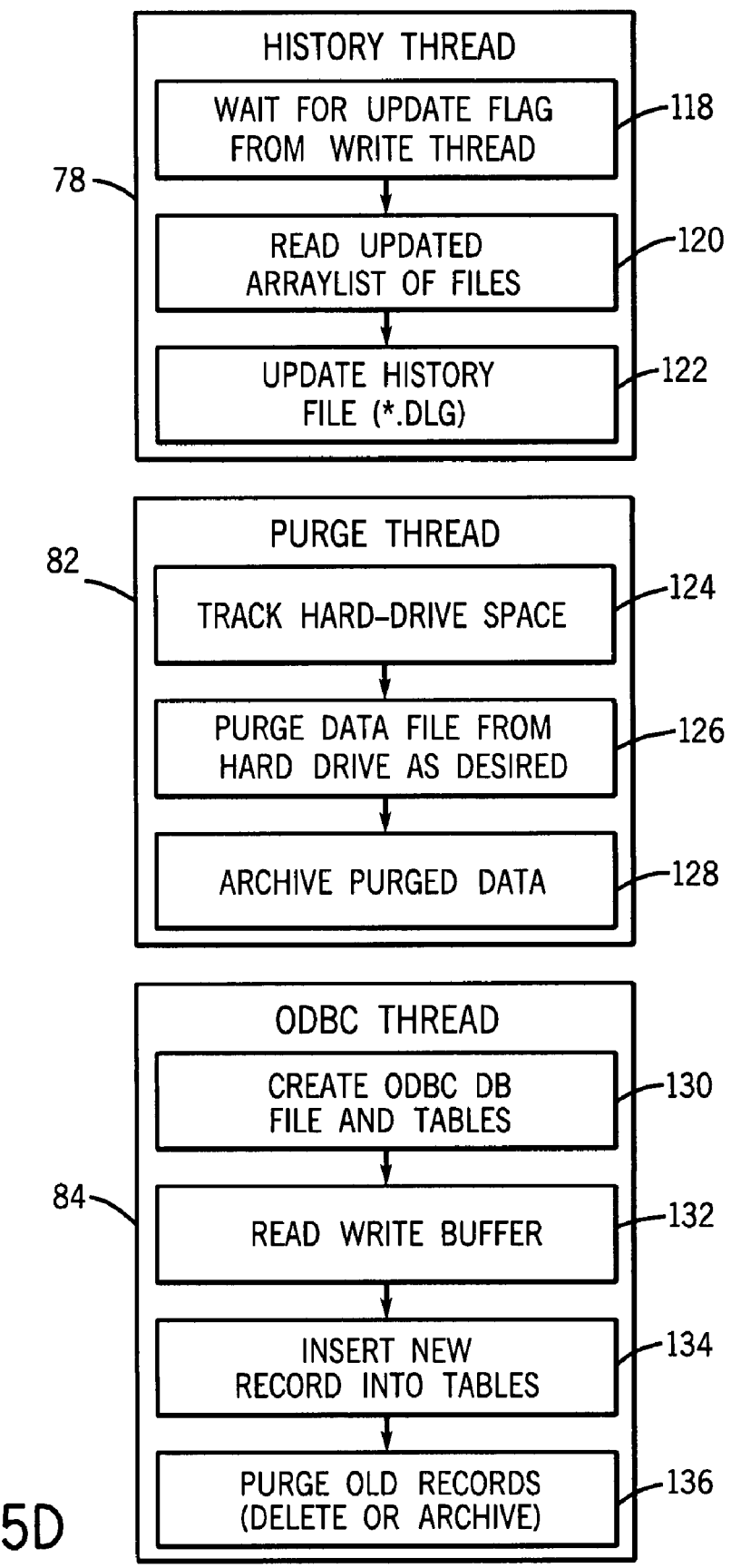
FIG. 5D is a block diagram that further illustrates the history thread, the purge thread, and the ODBC thread shown in FIG. 5, as well as their respective functions.

FIG. 5D illustrates history thread 78, purge thread 82, and ODBC thread 84, and their respective functions. History thread 78 is a bookkeeper of sorts and helps to coordinate the time stamped data. First, function 118 waits for an update flag from write thread 80 and its function 114. Once the update flag is received, function 120 reads the updated arraylist of files and function 122 updates the history file (see FIG. 4, item 64). As discussed above, the arraylist of files includes a history of the starting and stopping time for each data set as well as the associated file name for each data set. In short, the array list of files basically serves to organize each data file temporally. In one embodiment of the present invention, the array list of files includes a history file having a *.DLG extension. This file then includes the start time, end time, and file name for the data files to record and organize the data files in their temporal order (see FIG. 4, items 62 and 64).

Purge thread 82 manages the database to ensure hard drive space is not inadvertently exhausted. Function 124 tracks the available hard-drive memory space to ensure there is adequate memory for the generated files. Additionally, a user may preset a maximum data file limit and function 126 will purge the data file when that limit is reached. Function 128 may then archive the purged data per the instructions provided by the user or pre-determined default settings. In one embodiment of the present invention, the user configures how many hours or days before data files are purged (deleted or archived). Finally, ODBC thread 84 manages the ODBC database file. Function 130 creates the database file and associated data tables. When data is present in the write buffer generated by process thread 76, function 132 reads the records and function 134 writes the records into the database file. Additionally, function 136 monitors the database file, and purges (deletes or archives to a secondary database file) the records per user configuration 86 from the main thread 72.

It should be noted, that while a number of threads, sub-threads, and functions were discussed above, the present invention is not limited to these specific threads and may include additional threads, sub-threads, and functions that enable a high speed transmission and conversion of process data from an industrial control system to a remote client application While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system for transmitting data from an industrial control system comprising:
a first processor configured to generate data arrays from values received from an industrial process;
a second processor configured to receive the data arrays and to convert data in the arrays to time stamped messages, each message including a plurality of tags, each tag corresponding to an individual one of the values;
an open-socket interface configured to transmit the time stamped messages from the second processor as time stamped packets; and
a client application coupled to the open-socket interface and configured to convert the time stamped packets to records in a standard structured data format.

2. The system of claim 1, wherein the first processor is part of a programmable controller configurable to control the industrial process.

3. The system of claim 1, wherein the first and second processors are coupled to one another on a common data backplane.

4. The system of claim 3, wherein the open-socket interface is coupled to the second processor on the common data backplane.

5. The system of claim 1, wherein the second processor is configured to associate the messages in sets.

6. The system of claim 1, wherein each tag corresponds to a single input, output, or computed value.

7. The system of claim 1, wherein the client application is configured to capture the time stamped packets into a fixed sized buffer and place the buffer into a process queue.

8. The system of claim 7, wherein the client application is further configured to verify a total number of time stamped packets and tags included in a set by tracking the number of packets received between timestamps and counting the number of tags in each packet.

9. The system of claim 7, wherein the client application is further configured to separate individual packets and to create data files.

10. The system of claim 1, wherein the client application is configured to convert each of a plurality of tags in the time stamped packets, each corresponding to individual input, output or computed values, to individual records in the standard structured data format.

11. The system of claim 1, wherein the standard structured data format is a standard database format.

12. A system for transmitting data from an industrial control system comprising:
a programmable process controller including a first processor configured to generate data arrays from values received from a controlled process;
a second processor configured to receive the data arrays and to convert data in the arrays to time stamped messages, each message including a plurality of tags, each tag corresponding to an individual one of the values;
an open-socket interface configured to transmit the time stamped messages from the second processor as time stamped packets; and
a client application coupled to the open-socket interface and configured to convert the time stamped packets to records in a standard database format.

13. The system of claim 12, wherein the first and second processors are coupled to one another on a common data backplane.

14. The system of claim 13, wherein the open-socket interface is coupled to the second processor on the common data backplane.

15. The system of claim 12, wherein the client application is configured to capture the time stamped packets into a fixed sized buffer and place the buffer into a process queue.

16. The system of claim 15, wherein the client application is further configured to verify a total number of time stamped packets and tags included in a set by tracking the number of packets received between timestamps and counting the number of tags in each packet.

17. The system of claim 15, wherein the client application is further configured to separate the time stamped packets and to create data files.

18. A method for transmitting data from an industrial control system comprising:
(a) generating, via a first processor, data arrays from values received from an industrial process;

(b) converting, via a second processor, data in the arrays to time stamped messages, each message including a plurality of tags, each tag corresponding to an individual one of the values;

(c) transmitting the time stamped messages from the second processor via an open-socket interface as packet sets; and (d) receiving the packet sets from the open-socket interface and converting the sets to records in a standard structured data format.

19. The method of claim 18, wherein the steps (a), (b) and (c) are each performed by separate devices coupled to one another on a common data backplane.

20. The method of claim 18, wherein step (b) includes associating the messages in sets.

21. The method of claim 18, wherein each tag corresponds to a single input, output or computed value.

22. The method of claim 18, wherein step (d) includes associating sets of messages into packets and grouping the packets into a process queue.

23. The method of claim 18, wherein step (d) includes verifying a total number of individual packets and tags included in a set by tracking the number of individual packets received between timestamps and counting the number of tags in each packet.

24. The method of claim 18, wherein step (d) includes separating individual packets to create data files.

25. The method of claim 18, wherein step (d) includes converting each of a plurality of tags in the packet sets, each corresponding to individual input, output or computed values, to individual records in the standard structured data format.

* * * * *